US010272729B2

(12) United States Patent
Merrill et al.

(10) Patent No.: US 10,272,729 B2
(45) Date of Patent: Apr. 30, 2019

(54) INDEXABLE WASHER SYSTEM FOR WHEEL ALIGNMENT CORRECTION

(71) Applicants: Compagnie Generale des Etablissements Michelin, Clermont-Ferrand (FR); Michelin Recherche et Technique S.A., Granges-Paccot (CH)

(72) Inventors: Zachary Alexander Merrill, Greenville, SC (US); Matthew J. Hanlon, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 178 days.

(21) Appl. No.: 15/537,917

(22) PCT Filed: Mar. 10, 2015

(86) PCT No.: PCT/US2015/019662
§ 371 (c)(1),
(2) Date: Jun. 20, 2017

(87) PCT Pub. No.: WO2016/144330
PCT Pub. Date: Sep. 15, 2016

(65) Prior Publication Data
US 2017/0341478 A1     Nov. 30, 2017

(51) Int. Cl.
*B60G 3/26* (2006.01)
*B60B 35/00* (2006.01)
(Continued)

(52) U.S. Cl.
CPC .............. *B60G 3/265* (2013.01); *B60B 27/02* (2013.01); *B60B 35/009* (2013.01); *B60G 7/008* (2013.01);
(Continued)

(58) Field of Classification Search
CPC .. B60G 3/265; B60G 7/008; B60G 2200/464; B60G 2200/4622; B60G 2200/462;
(Continued)

(56) References Cited

U.S. PATENT DOCUMENTS 774,042 A * 11/1904 Cooper ................... 280/80.1
776,971 A * 12/1904 Walsh ................. F16L 27/0849
285/184
(Continued)

FOREIGN PATENT DOCUMENTS

FR          2965786 A1    4/2012
WO     WO2016/144328     9/1916
(Continued)

OTHER PUBLICATIONS

International Search Report dated Jun. 11, 2015 for International Application No. PCT /US2015/019633.
(Continued)

*Primary Examiner* — Paul N Dickson
*Assistant Examiner* — Timothy Wilhelm
(74) *Attorney, Agent, or Firm* — Dority & Manning, P.A.

(57) ABSTRACT

A system for wheel alignment provides an indexable pair of washers in conjunction with a sleeve having non-concentric inner and outer surfaces that allow for adjustments to camber, toe, and thrust. The system can be retrofitted to existing axle systems using a sleeve that fits over the spindle of the axle. Rotation of the sleeve relative to the spindle provides for adjustment to wheel alignment. The indexable washers can be used to determine the precise amount of adjustment and fix the position of the sleeve once adjusted. The system can be implemented regardless of the circumferential position (i.e. azimuthal orientation) of a keyway or groove on the axle spindle that is typically used to lock the position of the axle nut.

15 Claims, 12 Drawing Sheets

(51) Int. Cl.
    *B60B 27/02* (2006.01)
    *B62D 17/00* (2006.01)
    *B60G 7/00* (2006.01)

(52) U.S. Cl.
    CPC ........ *B62D 17/00* (2013.01); *B60G 2200/462* (2013.01); *B60G 2200/464* (2013.01); *B60G 2200/4622* (2013.01); *B60G 2204/61* (2013.01); *B60G 2206/50* (2013.01); *B60G 2206/99* (2013.01)

(58) Field of Classification Search
    CPC ............ B60G 2200/46; B60G 2204/61; B60G 2206/99; B60G 2206/50; B60B 35/009; B60B 27/02; B62D 17/00
    See application file for complete search history.

(56) References Cited

U.S. PATENT DOCUMENTS

| | | | | |
|---|---|---|---|---|
| 2,923,555 A * | 2/1960 | Kost | ...................... | B62D 17/00 280/86.753 |
| 3,520,377 A * | 7/1970 | Wallace | ................... | B60B 37/00 180/7.1 |
| 4,037,680 A * | 7/1977 | Grove | ................... | B60K 17/306 180/254 |
| 4,195,862 A * | 4/1980 | Specktor | .............. | B60K 17/306 180/253 |
| 4,252,338 A * | 2/1981 | Ingalls | ................... | B62D 17/00 280/86.756 |
| 4,400,007 A * | 8/1983 | Ingalls | ................... | B62D 17/00 280/86.756 |
| 4,420,272 A * | 12/1983 | Ingalls | ................... | F16C 23/10 280/86.756 |
| 4,541,162 A * | 9/1985 | Halvin | ................... | G01B 5/255 29/407.05 |
| 4,641,853 A * | 2/1987 | Specktor | ................ | B62D 17/00 280/86.756 |
| 4,684,150 A * | 8/1987 | Specktor | ................ | B62D 17/00 280/86.753 |
| 4,921,271 A | 5/1990 | Berry | | |
| 4,970,801 A * | 11/1990 | Specktor | ................ | B62D 17/00 280/86.755 |
| 5,044,659 A | 9/1991 | Specktor | | |
| 5,048,979 A | 9/1991 | Coates | | |
| 5,060,962 A * | 10/1991 | McWethy | ................ | A61G 5/10 280/250.1 |
| 5,110,151 A * | 5/1992 | Blechschmidt | ........ | B62D 17/00 280/86.753 |
| 5,201,898 A | 4/1993 | Pierce | | |
| 5,259,676 A | 11/1993 | Marti | | |
| 5,383,678 A * | 1/1995 | Sokol | ...................... | B62D 17/00 280/86.753 |
| 5,622,378 A | 4/1997 | Schlosser | | |
| RE36,058 E * | 1/1999 | Sokol | ...................... | B62D 17/00 280/86.753 |
| 5,918,707 A * | 7/1999 | Saunders, III | .......... | B60B 3/145 188/18 A |
| 6,036,205 A * | 3/2000 | Schlosser | ............... | B62D 17/00 280/86.751 |
| 6,374,665 B1 * | 4/2002 | Somppi | .................. | B62D 17/00 73/146 |
| 6,431,659 B1 * | 8/2002 | Somppi | .................. | B62D 17/00 301/131 |
| 6,474,873 B1 * | 11/2002 | Krisher | ................. | F16C 19/548 384/563 |
| 6,557,872 B1 | 5/2003 | Gerrard | | |
| 6,705,626 B2 | 3/2004 | Chevillard | | |
| 7,210,693 B2 * | 5/2007 | Ingalls | ................... | B62D 17/00 280/86.756 |
| 8,464,611 B1 | 6/2013 | Chandler | | |
| 8,918,974 B2 * | 12/2014 | Merrill | ................... | B60B 35/04 280/86.75 |
| 10,106,195 B2 * | 10/2018 | Merrill | ................... | B62D 17/00 |
| 10,124,829 B2 * | 11/2018 | Merrill | ................... | B60G 9/00 |
| 2004/0178595 A1 | 9/2004 | Coggin | | |
| 2005/0280229 A1 | 12/2005 | Ingalls | | |
| 2007/0052282 A1 | 3/2007 | White | | |
| 2007/0096418 A1 | 5/2007 | Houser | | |
| 2008/0024003 A1 | 1/2008 | White | | |
| 2011/0239430 A1 | 10/2011 | Merrill | | |
| 2011/0291468 A1 | 12/2011 | Reiger | | |
| 2017/0080760 A1 | 3/2017 | Foor | | |
| 2017/0120674 A1 * | 5/2017 | White | .................... | B60B 27/02 |
| 2017/0240206 A1 * | 8/2017 | Merrill | .................. | B62D 17/00 |
| 2017/0247055 A1 | 8/2017 | Merrill | | |
| 2018/0009478 A1 | 1/2018 | Merrill | | |
| 2018/0009479 A1 | 1/2018 | Merrill | | |
| 2018/0178842 A1 | 6/2018 | Merrill | | |

FOREIGN PATENT DOCUMENTS

| | | |
|---|---|---|
| WO | WO 1998/32639 | 7/1998 |
| WO | WO 2001/74647 | 10/2001 |
| WO | WO 2013/104427 A1 | 7/2013 |
| WO | WO2016/144329 | 9/2016 |

OTHER PUBLICATIONS

International Search Report dated Jun. 10, 2015 for International Application No. PCT/US2015/019647.
International Search Report dated Jun. 29, 2015 for International Application No. PCT/US2015/019662.
Extended European Search Report for PCT/US2015/019633 dated Oct. 9, 2018.
Extended European Search Report for PCT/US2015/019647 dated Oct. 9, 2018.
Extended European Search Report for PCT/US2015/019662 dated Oct. 9, 2018.

* cited by examiner

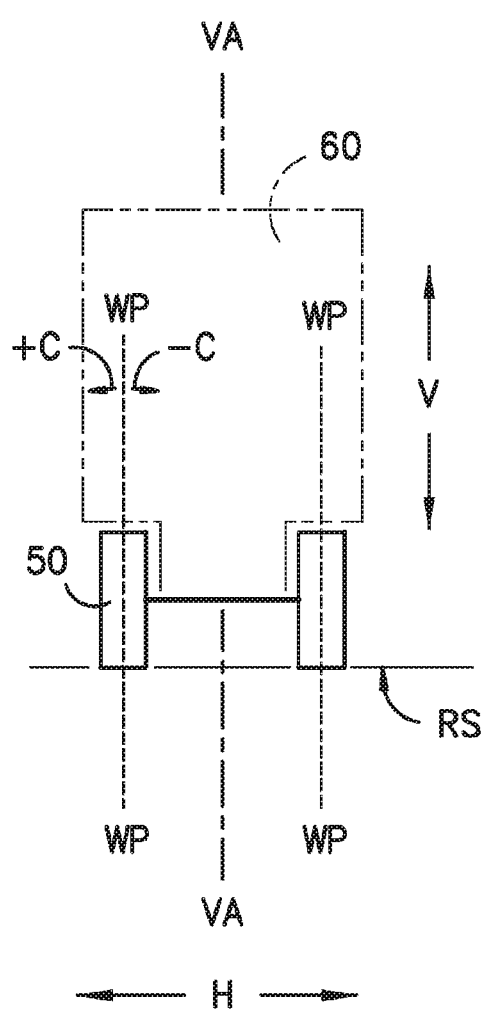
FIG. -1-
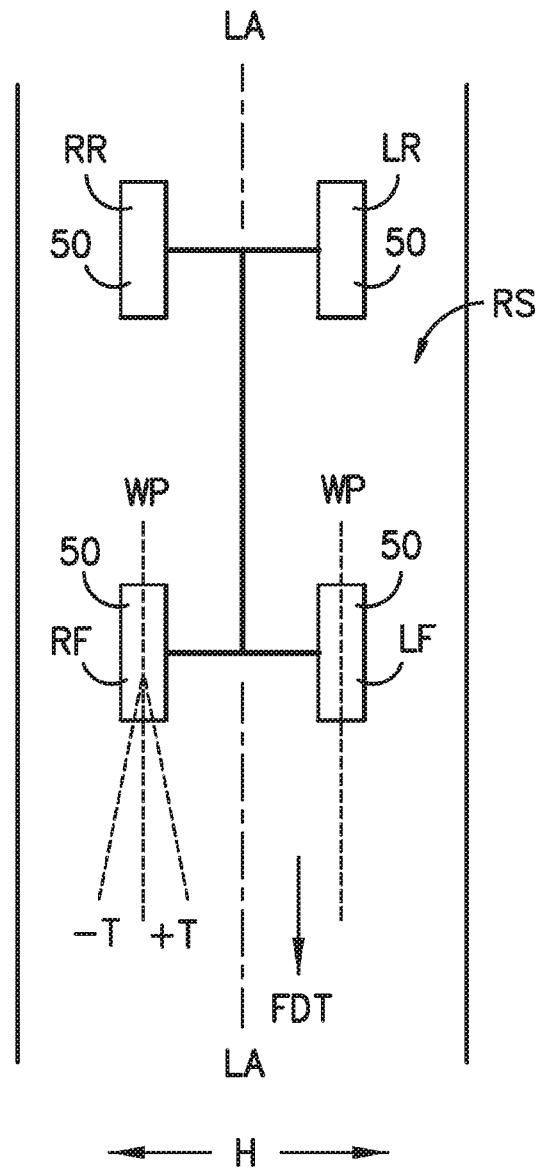
FIG. -2-

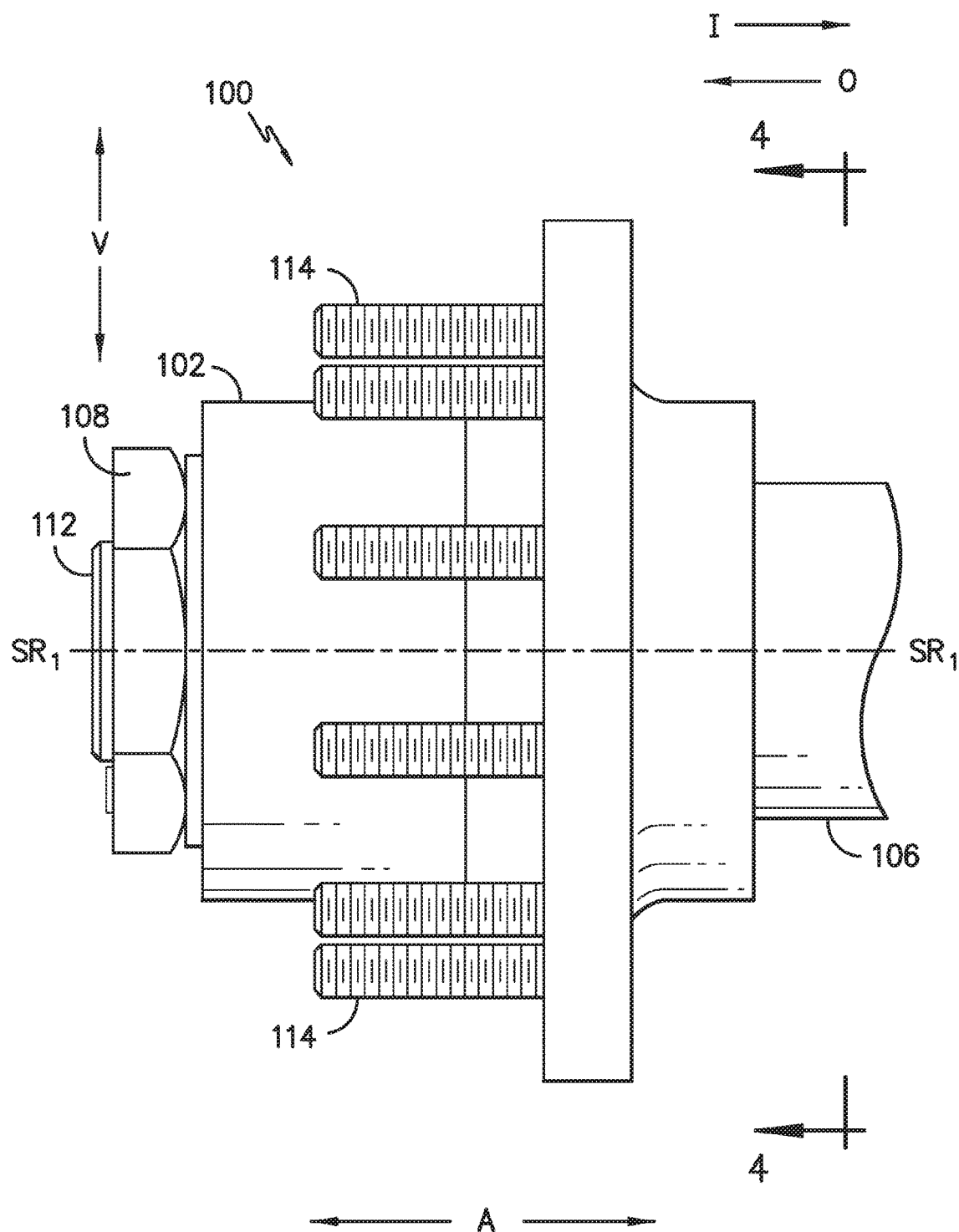
FIG. -3-

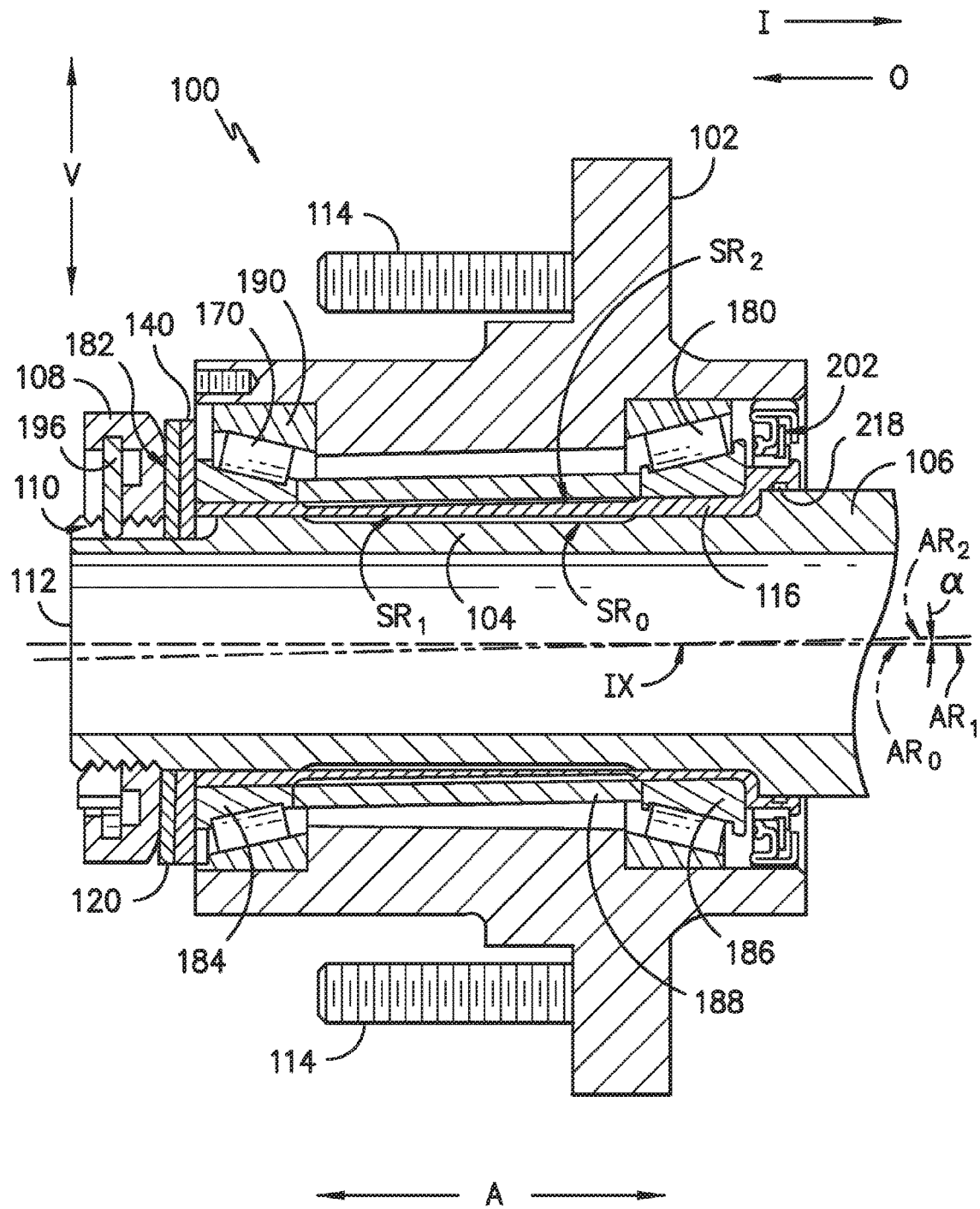
FIG. -4-

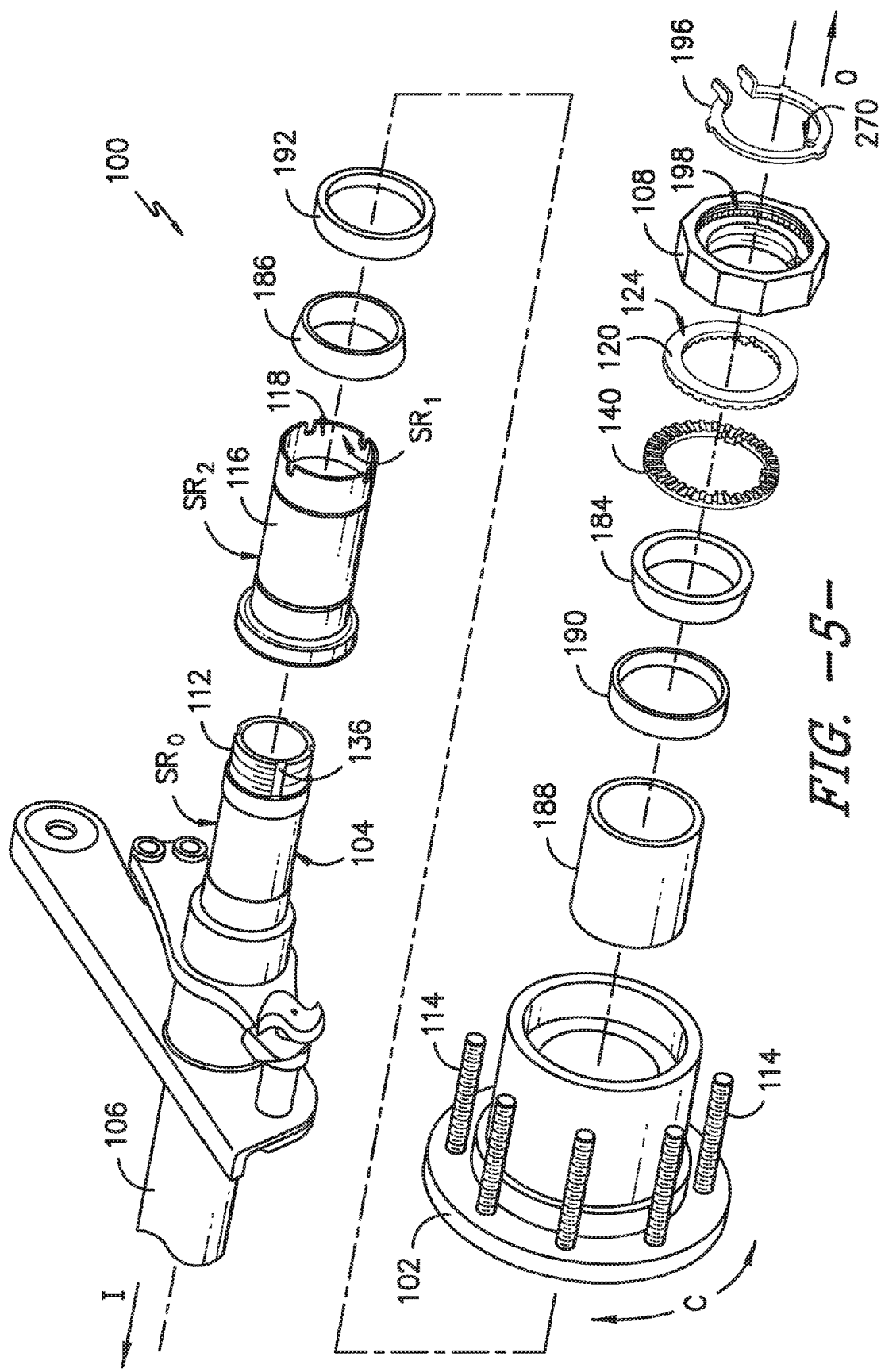

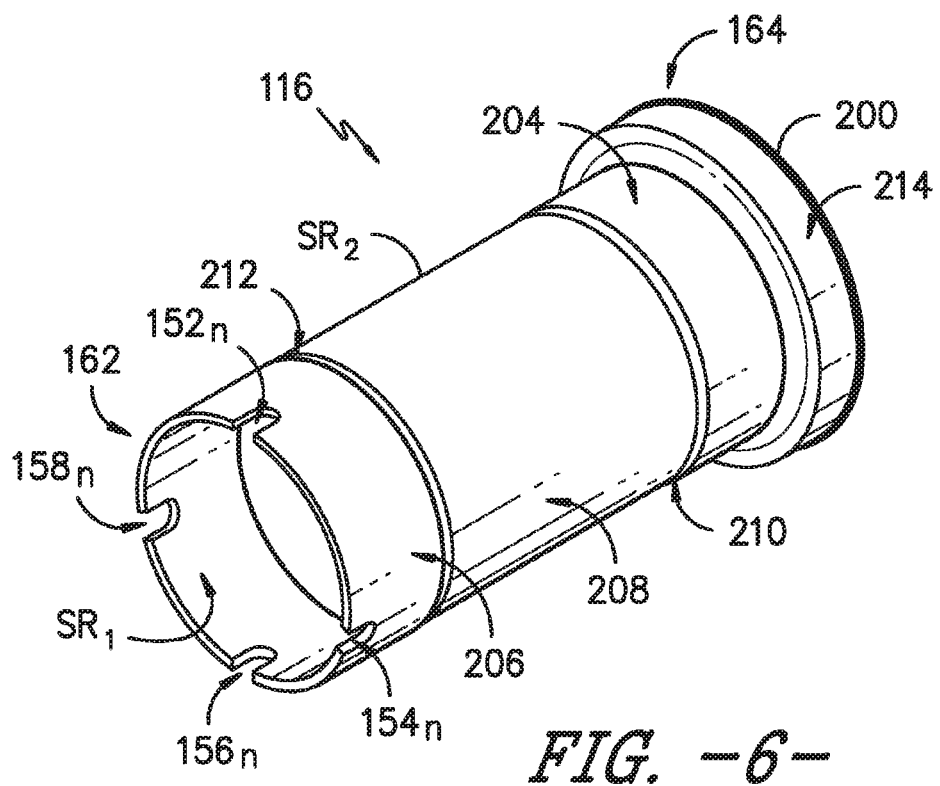
FIG. -6-
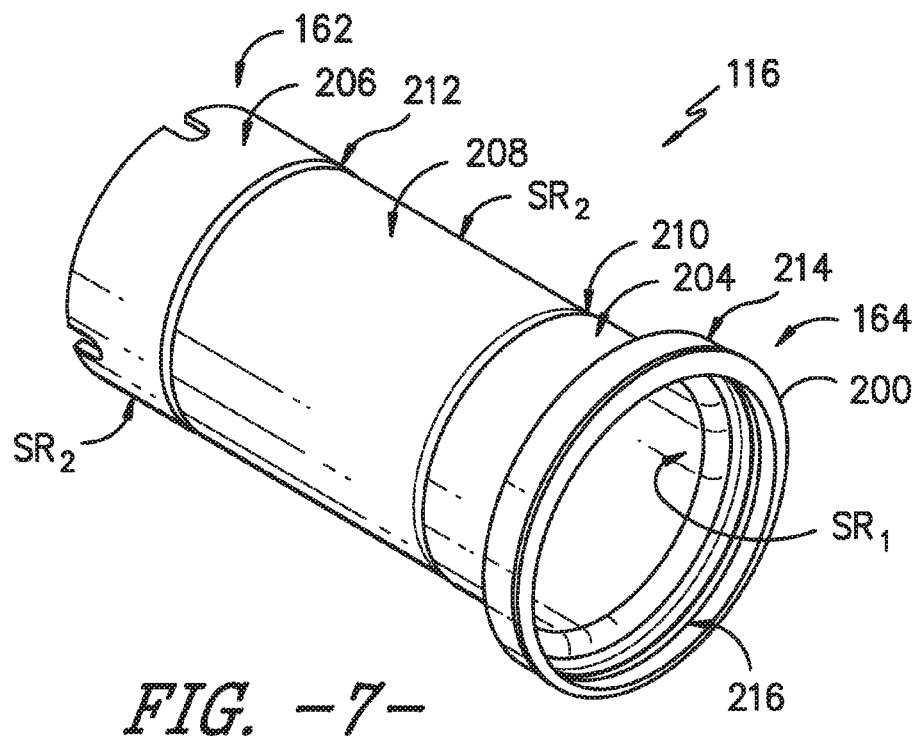
FIG. -7-

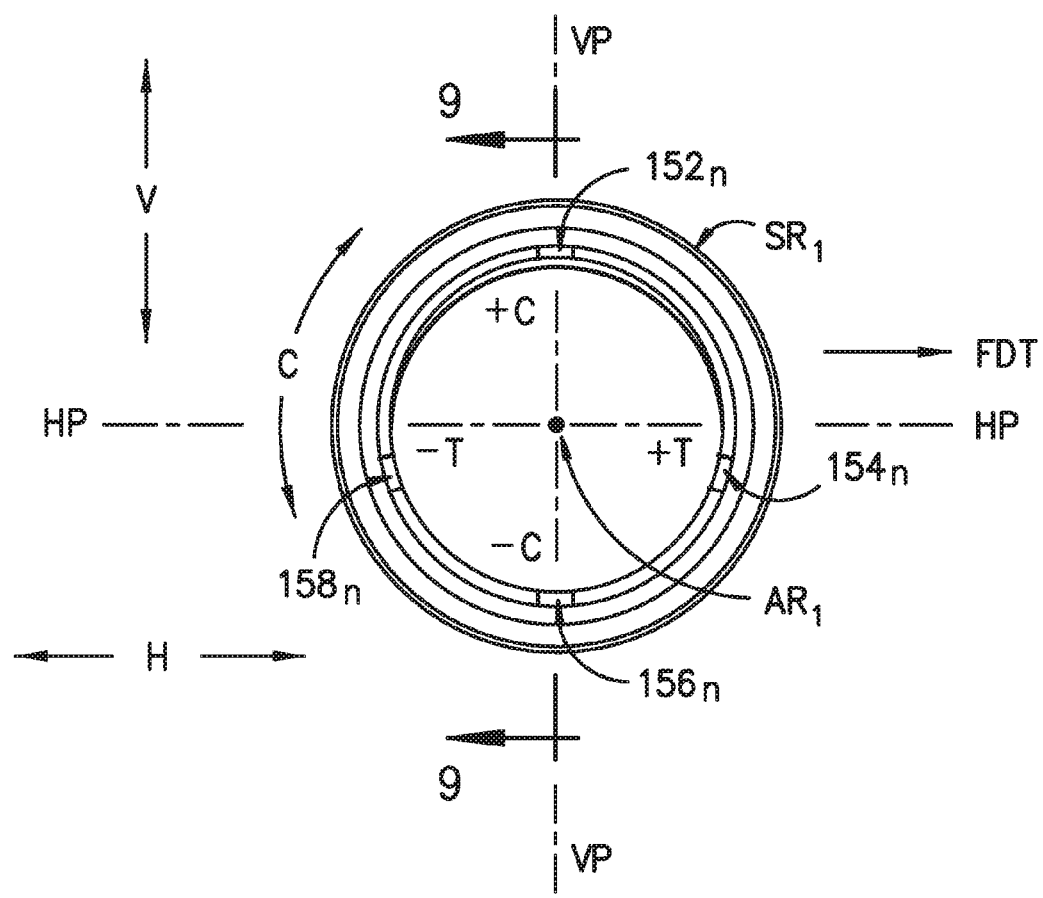
FIG. -8-
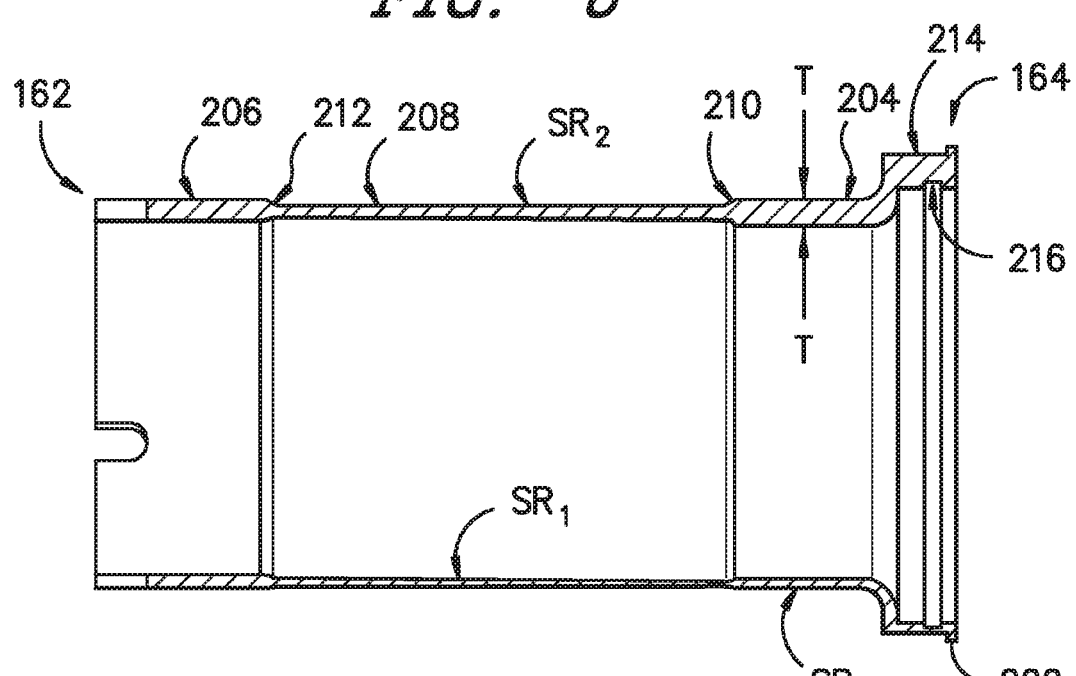
FIG. -9-

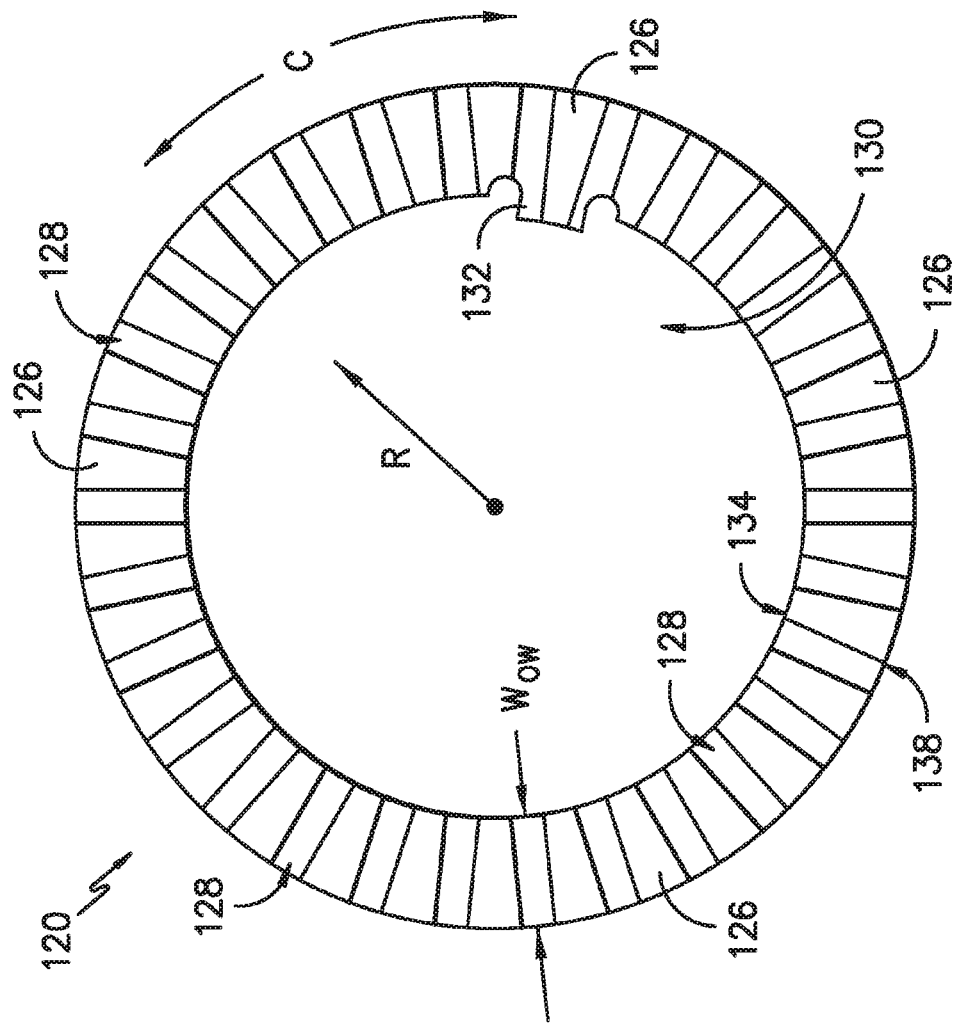
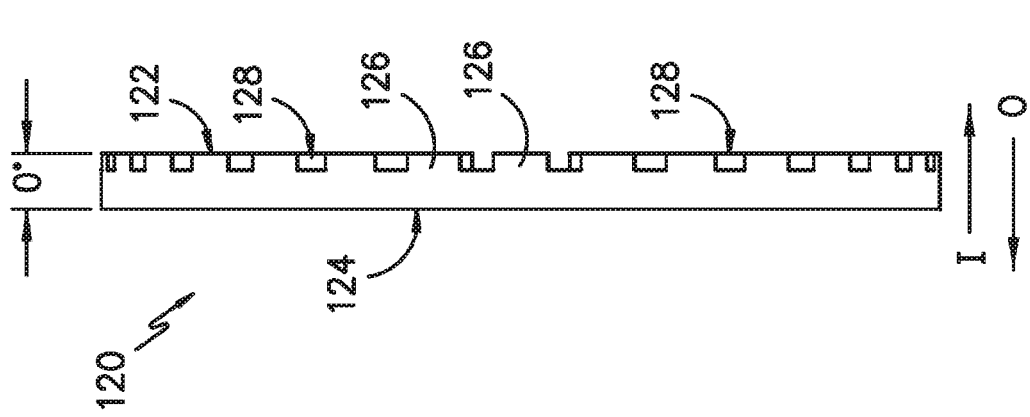

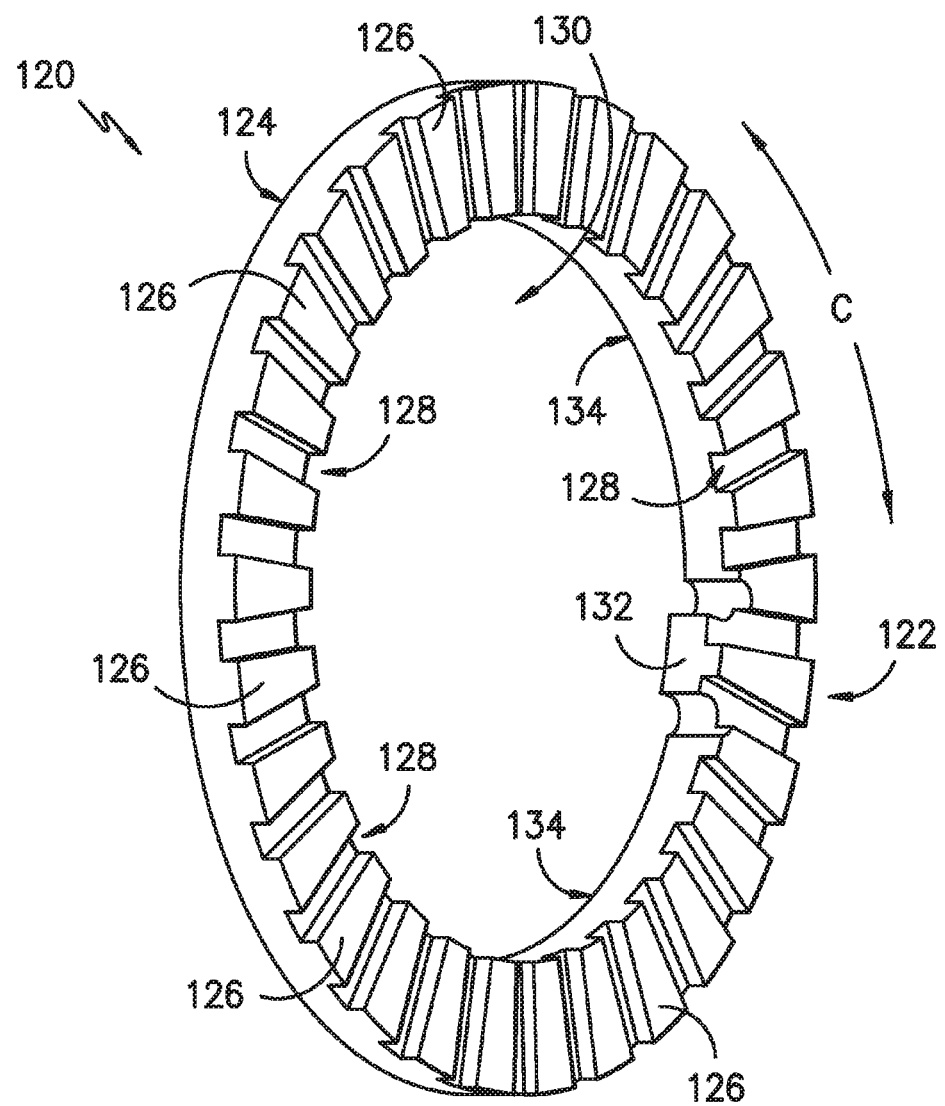
FIG. -12-

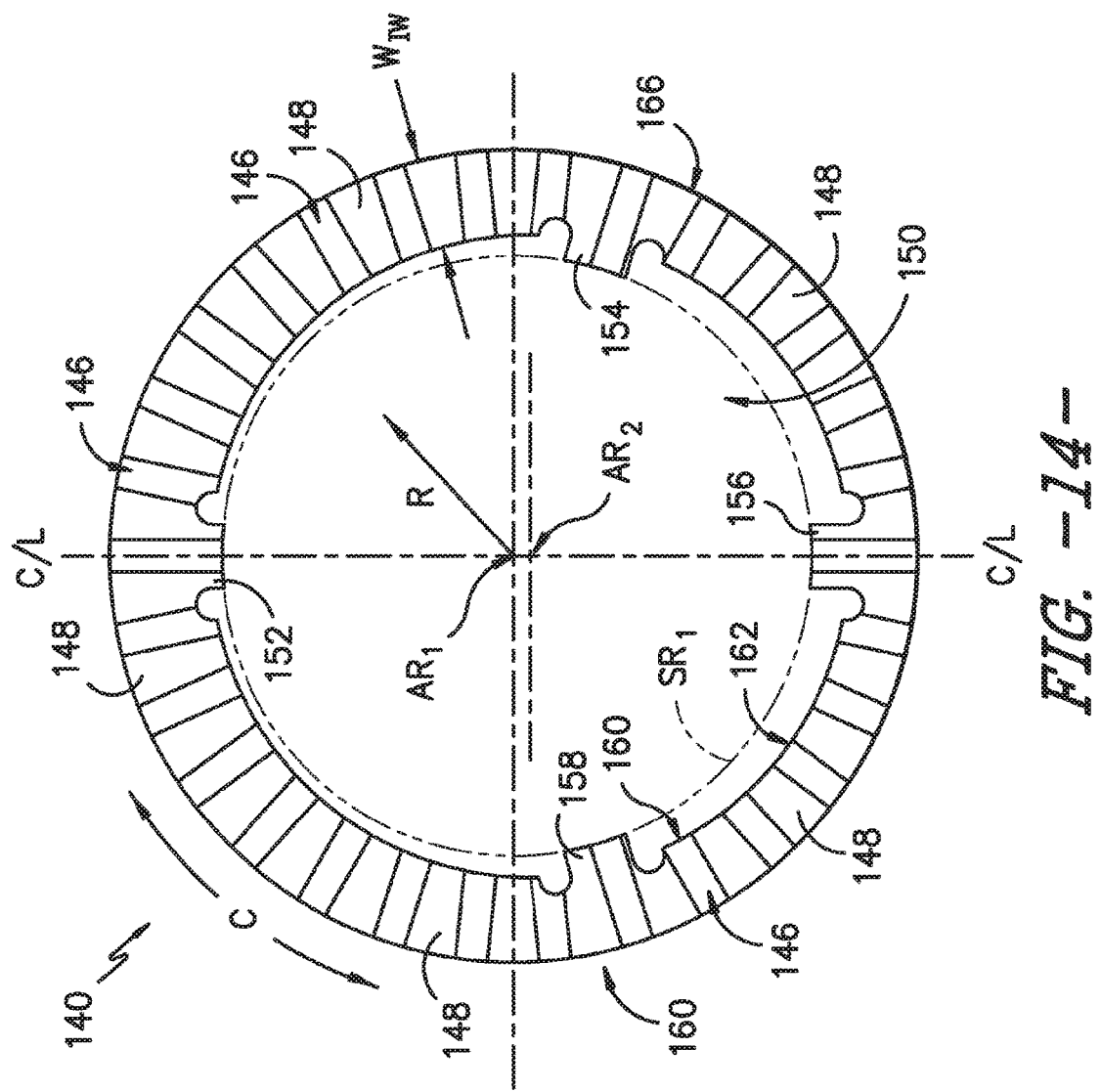
FIG. -14-
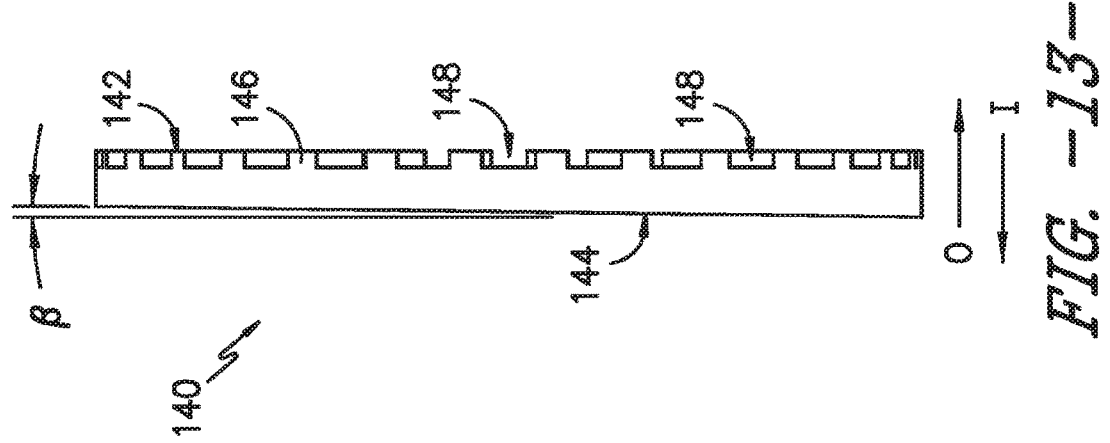
FIG. -13-

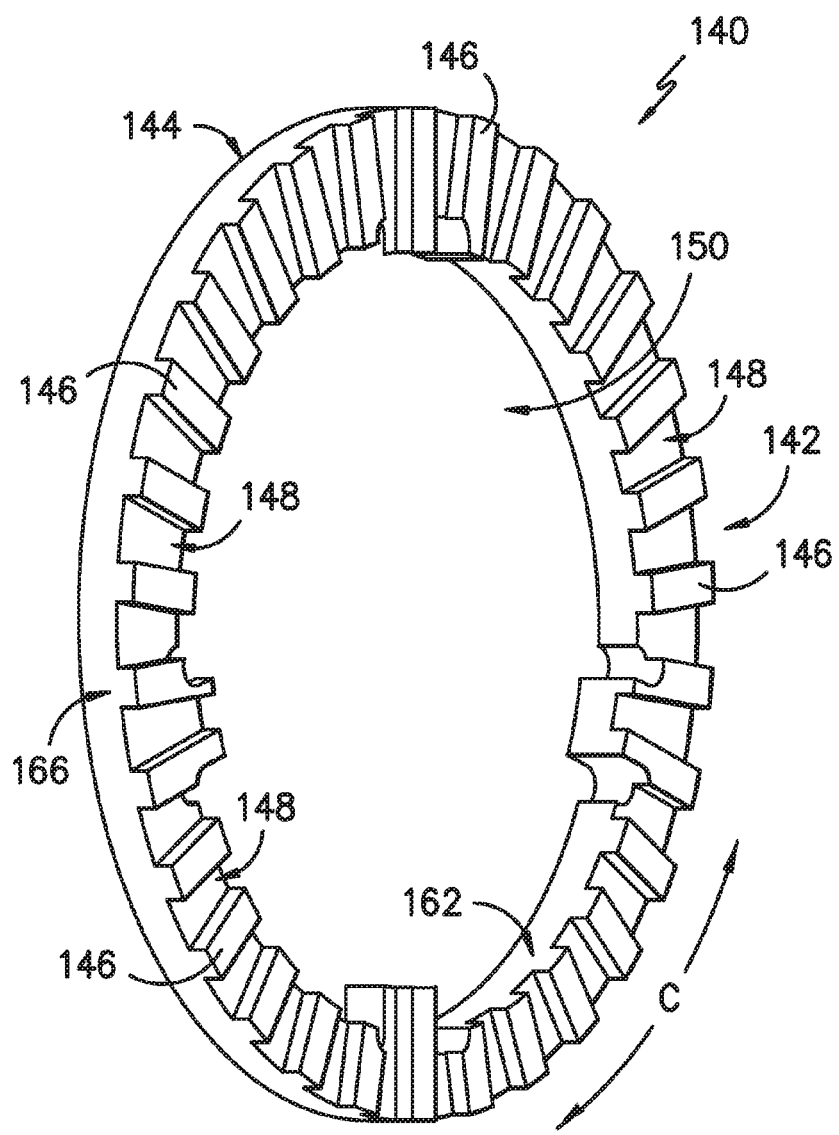
FIG. -15-

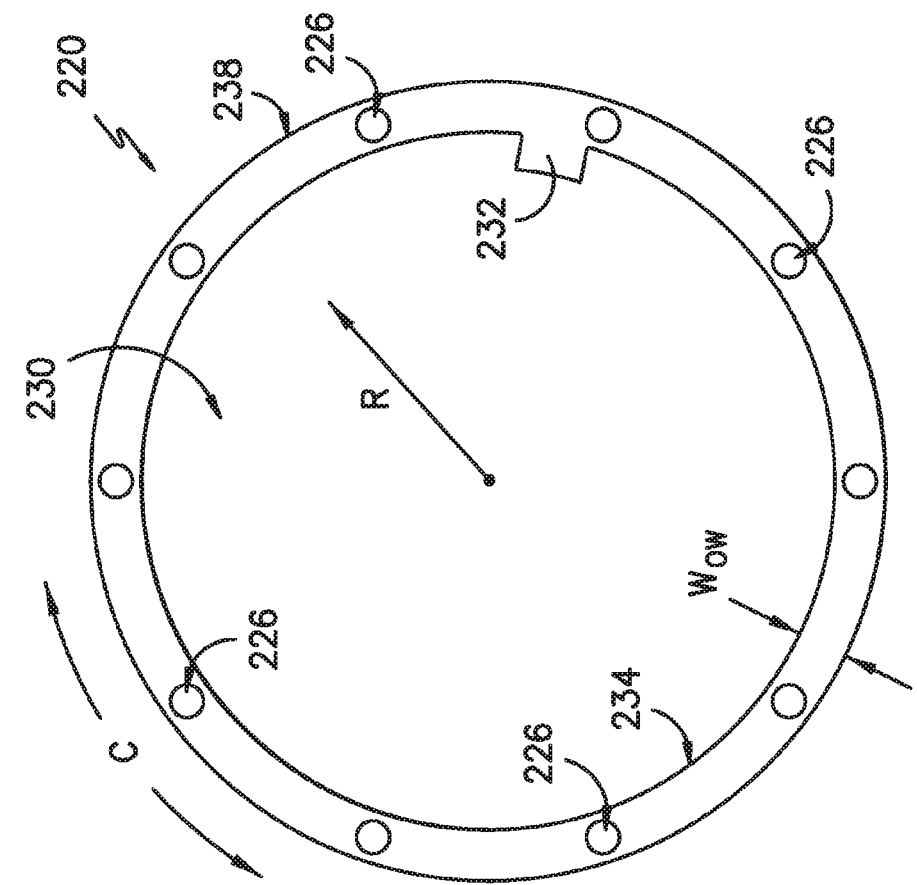
FIG. -17-
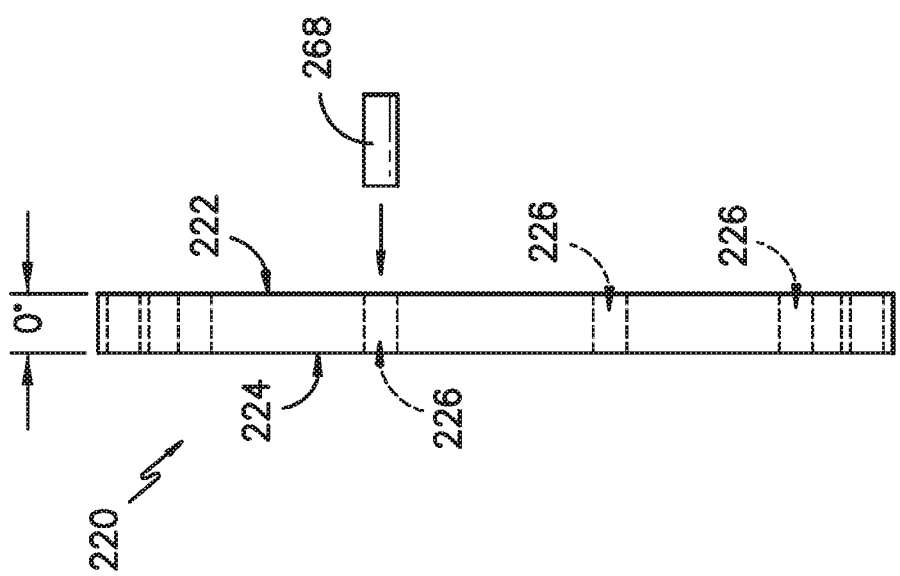
FIG. -16-

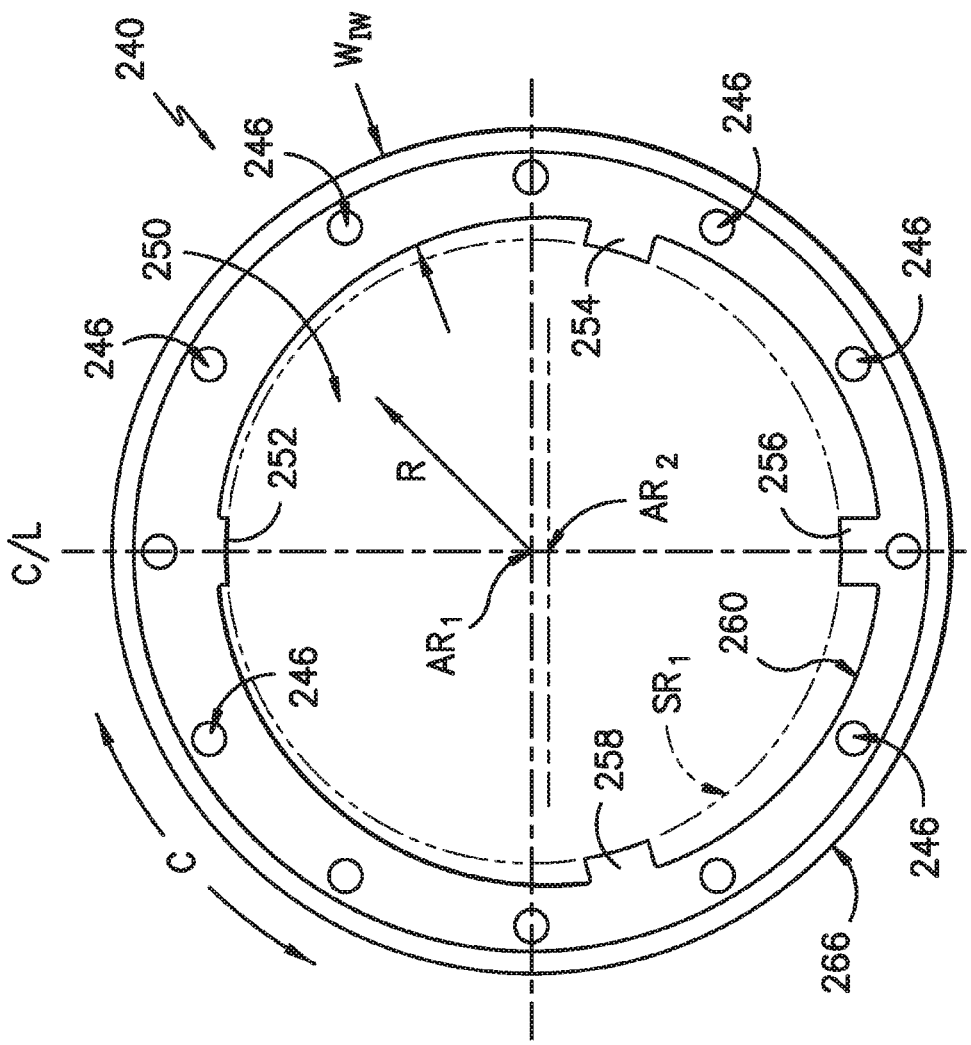
FIG. -19-
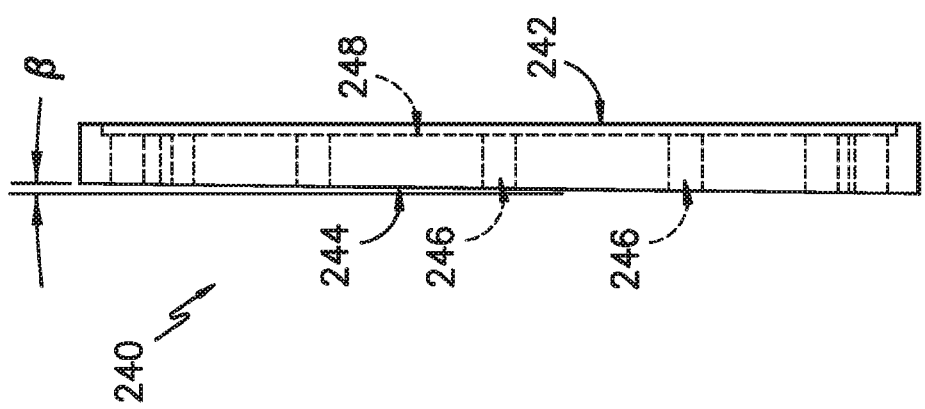
FIG. -18-

INDEXABLE WASHER SYSTEM FOR WHEEL ALIGNMENT CORRECTION

FIELD OF THE INVENTION

The subject matter of the present disclosure relates generally to a system for correcting the alignment of a wheel mounted onto a hub and axle assembly.

BACKGROUND OF THE INVENTION

The alignment of a vehicle's wheel plane WP relative to the path traveled by the vehicle affects not only the handling of the vehicle but also affects the wear on the tires. As used here, alignment refers to camber, toe, and thrust. Referring to FIG. 1, camber is the angle between the wheel plane WP and a vertical axis VA of the vehicle 60. Positive camber (+C) refers to an angle where the top of the wheel 50 is farther away from the center of vehicle 60 than the bottom of the wheel 50. Negative camber (−C) refers to an angle where the bottom of the wheel 50 is farther away from center of the vehicle 60 than the top. Generally speaking, camber changes of even a fourth of one degree can impact tire wear. Abnormal tire wear has been observed in certain applications with even smaller changes in camber angle. Free rolling (non-driven) tires in low wear rate applications are especially sensitive to camber and thus particularly prone to developing abnormal wear if the camber angle is unfavorable.

Referring to FIG. 2, toe is the angle the wheel plane WP makes with a centerline along the longitudinal axis LA of the vehicle 60. Positive toe (+T), also referred to as toe in, is a condition where the front of the wheel 50 or the wheel plane WP is pointing in or towards the center line of the vehicle 60. Negative toe (−T), also referred to as toe out, is a condition where the front of the wheel 50 or wheel plane WP points out or away from the center line of the vehicle 60. Thrust is the resulting direction of travel (FDT) of an axle as opposed to the direction that might be expected from the orientation of wheel planes WP of the wheels on the axle. Generally speaking, toe changes of even one-tenth of a degree can have an impact on tire wear.

The typical trailer axle is made by welding a pair of spindle forgings onto a piece of axle tubing then machining the precision surfaces of both spindles simultaneously in a lathe process. The resulting axle is near perfectly straight—i.e., each spindle axis possesses zero camber and zero toe. When a typical axle is installed under a vehicle (used herein to refer to both motorized vehicles as well as trailers) and placed into normal operation under typical loading conditions, the camber does not remain at zero. The axle under load, although quite rigid, flexes. The flexing of the axle occurs because the suspension is attached to the axle at load transfer points which are significantly inboard of the ends of the axle, but the tires support the weight of the vehicle by means of attachment points which are relatively near the outboard ends of the axle. As a result of this geometry, the weight of the vehicle imposes a bending moment on the axle which in turn causes upward deflection of the ends of the axle resulting in the tires presenting a slight negative camber. As the load increases, the more negative the camber becomes. At the typical maximum legal tandem axle load in the United States, it would not be unusual for the wheel camber angle to reach approximately 0.5 degrees. The contribution of tire alignment to tire wear can be particularly problematic with vehicles used for transporting heavy loads.

Once the weight is removed, the axle may recover and again affect the alignment of the wheels. Because of factors such as the additional costs and amount of material that would be required, increasing the stiffness of the axle to resolve camber issues may not be practical.

Even with the same amount of camber on each axle spindle, axle camber affects the tires differently depending on their individual wheel end position on the vehicle because most road surfaces (RS) are not flat transversely (orthogonal to the normal travel direction) across the road. The road surface is either crowned or sloped (by about 1.5% on average) so that water will evacuate from the road surface. Trucks, in North America and other countries using the right side of the road for forward traffic, generally operate in the right most lane, which is usually sloped very slightly to the right. This means that as vehicle is traveling on the road way, there is a gravitational force pulling the vehicle to the right. This force is resisted through the tire contact patch, and the tire transmits this force to the axle by transmitting the required force opposite of the direction of pull through its interface with its wheel. The result is that as the tire rolls down the highway, the contact patch shifts leftward with respect to the wheel plane WP. At full load and at normal pressure on a typical New Generation Wide Base Single tire (NGWBS tire), this shift has an effect on tire shoulder wear that is roughly the equivalent of a 0.2 degree shift in wheel camber. This means that, although the left and the right wheel may each measure approximately −0.5 degree of camber, when the shift effect is considered, the effective camber angle on the left side tires is approximately −0.7 degree, and the effective camber angle on the right side tires is approximately −0.3 degree. As a consequence of this phenomenon, tires on the driver side left of the vehicle usually experience worse inboard shoulder wear than tires on the driver side right of the vehicle.

When a typical tandem axle vehicle (tractor or trailer) turns, the dynamics of the vehicle favor lateral grip by the forward axle tires. As a result, the pivot point of the vehicle shifts toward the forward axle tires, and the rear axle tires will tend to have greater slip laterally as the vehicle negotiates a turn. For this reason, the rear tires on a tandem axle pair receive more scrub and have a faster wear rate than the tires on the forward axle. Scrub tends to arrest the development of irregular wear and thus the rear tires usually are less affected by the camber issue than are the tires on the forward axle.

As a consequence, irregular tire wear is usually worst on the inboard surface of the LF tire. Next worst is the LR tire. The RF tire comes next but is sometimes similar in severity to the LR. The most even wear usually is found on the RR tire depending upon the particular application, load, and routes normally traveled. It should be obvious that in countries such as Australia, where drivers drive on the left side of the road instead of the right side, such observations would be reversed.

Therefore, a need exists for improved methods and apparatus for adjusting or correcting wheel alignment and, more particularly, for allowing adjustment to camber, toe, and thrust. A system that allows for adjustment while minimizing the amount of disassembly and labor required would be particularly advantageous. A system that can be retrofitted to existing axle systems would also be useful. Additional usefulness would be provided by a system that allows for adjustment of the alignment of an axle using hardware that can be used for the left or right sides of the vehicle.

SUMMARY OF THE INVENTION

The present invention provides a system for wheel alignment. An indexable pair of washers in conjunction with a sleeve having non-concentric inner and outer surfaces allows for adjustments to camber, toe, and thrust. The system can be retrofitted to existing axle systems using a sleeve that fits over the spindle of the axle. Rotation of the sleeve relative to the spindle provides for adjustment to wheel alignment. The indexable washers can be used to determine the precise amount of adjustment and fix the position of the sleeve once adjusted. The system can be implemented regardless of the circumferential position (i.e. azimuthal orientation) of a keyway or groove on the axle spindle that is typically used to lock the position of the axle nut. Additional objects and advantages of the invention wilt be set forth in part in the following description, or may be apparent from the description, or may be learned through practice of the invention.

In one exemplary embodiment, the present invention provides an assembly for selectively adjusting the alignment of a wheel on the spindle of a vehicle's axle. The assembly includes a sleeve having an inner surface of revolution about a first axis and an outer surface of revolution about a second axis. The first axis and the second axis are at a non-zero angle α from each other. The sleeve defines an interior for receipt of the spindle. The sleeve has an inboard end and an outboard end. An inboard washer is received onto the outboard end of the sleeve, the inboard washer having an inboard face and an opposing, outboard face forming a non-zero angle β with the inboard face.

The assembly includes means for preventing the rotation of the inboard washer relative to the sleeve.

An outboard washer is located at the outboard end of the sleeve at a position adjacent to the inboard washer, the outboard washer having an inboard thee and an opposing, outboard face. The outboard washer includes at least one key for engaging the spindle and preventing rotation of the outboard washer relative to the spindle.

The assembly includes means for engaging the inboard washer and the outboard washer so as to prevent rotation of the inboard washer and sleeve about the spindle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a front view of an exemplary vehicle having wheels as may benefit from use of the present invention.

FIG. 2 illustrates a top view of the exemplary vehicle of FIG. 1.

FIG. 3 illustrates a view (top, bottom, or side) of an exemplary assembly of the present invention as may be used for correction of toe, camber, and/or thrust.

FIG. 4 illustrates a cross-sectional view along line 4-4 of the exemplary assembly of FIG. 3.

FIG. 5 provides an exploded perspective view of the exemplary assembly of FIG. 3.

FIG. 6 provides a perspective view of art outboard end of an exemplary sleeve of the present invention.

FIG. 7 provides a perspective view of art inboard end of the exemplary sleeve of FIG. 6.

FIG. 8 provides an end view, from the outboard side, of the exemplary sleeve of FIG. 6.

FIG. 9 is a cross-sectional view of the exemplary sleeve taken along line 9-9 of FIG. 8.

FIG. 10 is a side view of an exemplary outboard washer of the present invention.

FIG. 11 is a front view of the exemplary washer of FIG. 10, and

FIG. 12 is a perspective view of the exemplary washer of FIG. 10.

FIG. 13 is a side view of an exemplary inboard washer of the present invention.

FIG. 14 is a front view of the exemplary washer of FIG. 13, and

FIG. 15 is a perspective view of the exemplary washer of FIG. 13.

FIG. 16 is a side view of another exemplary outboard washer of the present invention.

FIG. 17 is a front view of the exemplary washer of FIG. 16.

FIG. 18 is a side view of another exemplary inboard washer of the present invention.

FIG. 19 is a front view of the exemplary washer of FIG. 18.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

For this disclosure, the following terms are defined as follows:

"Axial direction," or the letter "A" without a subscript in the figures, refers to a direction parallel to the axis of rotation of e.g., the hub or the wheel as it travels along a road surface. As used in the figures herein, the vertical direction V is orthogonal to the axial direction and the horizontal direction H is parallel to the axial direction A.

"Radial direction" or the letter "R" in the figures refers to a direction that is orthogonal to the axial direction and extends in the same direction as any radius that extends orthogonally from the axial direction.

"Inboard" refers to a direction along axial direction A that is towards the vehicle and is designated with the letter I.

"Outboard" refers to a direction along axial direction A that is away from the vehicle and is designated with the letter O.

"Surface of revolution" or the letters AR is the surface in Euclidean space that is formed by rotating a curve or line around a straight line (referred to herein as the axis) in its plane.

"Wheel plane" or the letters "WP" is a plane passing down the center of the wheel (including the tire) and dividing the wheel into two equal, circular portions.

"Toe" or the letter "T" means the angle of the wheel plane WP with respect to a longitudinal axis along the center of the vehicle.

"Camber" or the letter "C" means the angle of the wheel plane WP with respect to the vertical axis VA of the vehicle. As used herein, when the wheel plane is parallel to the vertical direction and orthogonal to the axial direction, both camber and toe are considered to be at zero—i.e. in a position of zero camber angle or zero toe angle of the wheel alignment.

"Vehicle" includes motorized vehicles and non-motorized vehicles including trailers.

FIGS. 3, 4, and 5 illustrate an exemplary assembly 100 of the present invention as may be used to make adjustments to camber, toe, and thrust by adjusting the alignment of the axis of rotation of a hub 102 relative to a spindle 104 positioned at the end of an axle 106. Hub 102 is retained onto axle 106 by an axle nut 108 (also referred to as a spindle nut) that engages complementary threads 110 on threaded end 112 of spindle 104. A clip 196 is received into teeth 198 (FIG. 5) of axle nut 108. Clip 196 includes a tab 270 received into groove 136 to prevent nut 108 from turning once tightened onto spindle 104. Hub 102 is rotatable about spindle 104. A plurality of threaded lugs 114 may be used with complementary fasteners for securing a wheel or wheel rim onto assembly 100. Wheel assembly 100 may be used on a heavy commercial vehicle such as a trailer or other vehicle types as well. Hub 102 and axle nut 108 are provided by way of example—other hub types and mechanisms of attachment to axle 106 may also be used.

As shown in the cross-sectional view of FIG. 4 and in FIG. 5, spindle 104 has an outer surface of revolution $SR_O$ about a spindle axis $AR_O$ that is located at the center of spindle 104. For this exemplary embodiment, assembly 100 includes a cylindrically-shaped sleeve 116 that is machined with an internal diameter such that spindle 104 can be received within the interior 118 of sleeve 116 and onto outer surface $SR_O$. By way of example, the present invention can be retrofitted to the axle of an existing vehicle by machining a sleeve 116 with a corresponding size and internal diameter.

As shown in FIGS. 4, and 6 through 9, sleeve 116 has an inner surface of revolution $SR_1$ about a first axis $AR_1$. When spindle 104 is matingly received within the interior 118 of spindle sleeve 116 as shown in FIG. 4, spindle axis $AR_O$ and first axis $AR_1$ are coincident with other or i.e. geometrically the same. As also shown, spindle sleeve 116 has an outer surface of revolution $SR_2$ about a second axis $AR_2$ that forms a predetermined angle $\alpha$ relative first axis $AR_1$. Different sleeves 116 can be manufactured with different predetermined values for angle $\alpha$. In one exemplary embodiment, angle $\alpha$ has degree value that is within the range of $0.1° \leq \alpha \leq 0.7°$. In still another exemplary embodiment, angle $\alpha$ has value of $0.3°$. Other values may be used as well.

The cross-section of FIG. 4 is selected for purposes of illustrating the maximum value of angle $\alpha$. It should be appreciated that in a cross-sectional view that is orthogonal to the view shown in FIG. 5, it would appear that the value of angle $\alpha$ is zero. Thus, as used herein, angle $\alpha$ refers to the angle value as measured within a plane containing (i.e. coplanar with) first axis $AR_1$ and second axis $AR_2$. Additionally, as used herein, angle $\alpha$ also refers to the absolute value of the angle between first axis $AR_1$ and second axis $AR_2$ on the inboard side of the intersection IX of these two axes as depicted in FIG. 4.

The present invention allows the circumferential position (i.e. the location along circumferential direction C) of angle $\alpha$ about first axis $AR_1$ to be selectively determined in order to make changes in toe, camber, and thrust for a wheel mounted on hub 102. Such adjustment is accomplished by rotations of sleeve 116 to achieve the desired circumferential orientation of sleeve 116 relative to axle 106 as will be further described.

For example, referring specifically to FIG. 8 (a view of sleeve 116 from an outboard end), by locating axes $AR_1$ and $AR_2$ both within a vertical plane VP (a plane parallel to vertical direction V), positive or negative changes in camber can be accomplished. Positive camber can be created by positioning second axis $AR_2$ and angle $\alpha$ above first axis $AR_1$ within vertical plane VP as indicated by +C. Negative camber can be created by positioning second axis $AR_2$ and angle $\alpha$ below first axis $AR_1$ within vertical plane VP as indicated by −C.

Similarly, by locating axes $AR_1$ and $AR_2$ both within a horizontal plane HP (a plane parallel to horizontal direction H), positive or negative changes in toe can be accomplished. Positive toe can be created by positioning second axis $AR_2$ and angle $\alpha$ in front of first axis $AR_1$ (front being relative to the forward direction of vehicle travel or FDT as shown in FIG. 2) within horizontal plane HP as indicated by +T. Negative toe can be created by positioning second axis $AR_2$ and angle $\alpha$ behind first axis $AR_1$ relative to the forward direction of vehicle travel FDT within horizontal plane HP as indicated by −T.

Changes in both camber and toe can be effected by combinations where axes $AR_1$ and $AR_2$ (and angle $\alpha$) are at locations between horizontal plane HP and vertical plane VP. Accordingly, positive or negative changes in camber, positive or negative changes in toe, as well as adjustments to thrust can be accomplished simultaneously depending upon the circumferential orientation of sleeve 116 relative to spindle 104. The value of predetermined angle $\alpha$ as well as its circumferential location (i.e. the location of sleeve outer surface axis $AR_2$ relative to horizontal plane HP, vertical plane VP, and forward direction of travel FDT) will control the amount of camber, toe, and thrust adjustment that occurs using sleeve 116.

As now described, certain features are provided to fix the circumferential position of sleeve 116 during use so that e.g., rotational torque from rotation of a wheel on hub 102 (or gravitational forces applied to the hub by gravity) does not change sleeve 116's circumferential orientation once set. At the same time, such features allow the circumferential position of sleeve 116 to be readily adjusted and allow sleeve 116 to be retrofitted to an existing axle system regardless of the location of a keyway on groove 136 on spindle 104.

FIGS. 10 through 12 depict various views of a ring or outboard washer 120. As best viewed in FIG. 10, outboard washer 120 has an inboard face 122 and a flat outboard face 124 that lie in parallel planes as indicated by 0 degrees. Inboard face 122 includes a first plurality of gear teeth 126 separated by grooves 128 and positioned adjacent to each other along circumferential direction C. Gear teeth 126 each have a taper along a radially inward direction.

Outboard washer 120 defines a circular opening 130 (FIG. 12) through which spindle 104 extends in assembly 100 as shown in FIG. 4. Outboard washer 120 includes a key 132 that extends radially inward into circular opening 130 and projects above radially inner surface 134. Key 132 is received into a complementary groove 136 on the distal end of spindle 104 as shown in FIG. 3. As such, key 130 prevents outboard washer 120 from rotating relative to axle 106 within assembly 100. The width $W_{OW}$ of outboard washer 120—i.e. the dimension between radially inner surface 134 and radially outer surface 138—is uniform along circumferential direction C.

FIGS. 13 through 15 depict various views of a ring or inboard washer 140—i.e. a washer that is positioned on spindle 104 at a location inboard of outboard washer 120. As best viewed in FIG. 13, inboard washer 140 has an outboard face 142 and a flat inboard face 144 that lie in non-parallel planes—i.e. planes that are angled with respect to each other by a non-zero angle β as indicated so as to provide a taper. In one exemplary embodiment of the present invention, angle β is equal to angle α. The angled opposing faces 142 and 144 on inboard washer 140 enables outboard face 124 of the outboard washer 120 to engage an inboard face 182 of axle nut 108 and an inboard face 144 of inboard washer 10 to engage an outboard face of outboard bearing race 184 so as to evenly distribute the axial forces around the circumference of the respective faces.

Outboard face 142 includes a second plurality of gear teeth 146 separated by grooves 148 and positioned adjacent to each other along circumferential direction C. Gear teeth 146 each are oriented along a radial direction.

Inboard washer 140 defines a circular opening 150 (FIG. 14) through which spindle 104 extends in assembly 100 as shown in FIG. 4. Inboard washer 140 includes a plurality of bosses 152, 154, 156, and 158 that extend radially inward into circular opening 150 and project above radially inner surface 160. Bosses 152, 154, 156, and 158 are received into complementary notches 152n, 154n, 156n, and 158n, respectively, on the outboard end 162 of sleeve 116 (FIGS. 6 and 8). As such, the plurality of bosses and corresponding notches provide means to prevent inboard washer 140 and sleeve 116 from rotating relative to each other within assembly 100. Although four bosses and complementary notches are shown, in other configurations a different number may be used including e.g., 1, 2, 5, etc. Notably, for this exemplary embodiment, the taper of inboard washer 140 is aligned along a center line C/L that evenly divides boss 152 and opposing boss 156.

As shown in FIG. 14, the width $W_{IW}$ of the inboard washer 140—i.e. the dimension between radially inner surface 160 and radially outer surface 166—is non-uniform along circumferential direction C. Width $W_{IW}$ is smallest at boss 156 and largest at boss 152. The difference in width $W_{IW}$ allows sleeve 116 to be received at least partially within opening 150 of inboard washer 140 while the distal tip of each boss 152, 154, 156, and 158 extends to the inner surface of revolution $SR_1$ of sleeve 116. As shown, axis $AR_1$ is offset relative to axis $AR_2$ for reasons previously explained.

In assembly 100 as shown in FIG. 2, outboard washer 120 and inboard washer 140 engage each other. More specifically, the first plurality of gear teeth 126 of the outboard washer 120 are received into the grooves 148 of the inboard washer 140, and the second plurality of gear teeth 146 are engaged into the grooves 128 of the outboard washer 120. As such, gear teeth 126 and 146 provides means for selectively engaging the outboard washer 120 and the inboard washer 140 so as to prevent the rotation of the inboard washer 140 and sleeve 116 about spindle 104 during operation of a vehicle that uses assembly 100.

In order to adjust the wheel alignment—i.e. to adjust camber, toe, and thrust,—axle nut 108 is loosened so that gear teeth 126 and 146 can be disengaged by sliding outboard washer 120 in the outboard direction O. Sleeve 116 along with inboard washer 140 can then be rotated along circumferential direction C about spindle 104 to provide the correction desired based on the location of second axis $AR_2$ as previously described. Once sleeve 116 is in the desired circumferential position relative to spindle 104, gear teeth 126 and 146 can be reengaged to prevent the rotation of inboard washer 140 (and, therefore, sleeve 116) about spindle 104. Indicia such as numbers or marks can be placed on e.g., radially outer surface 166 to assist in identifying amount of correction, which can be correlated with a table or other data.

As shown by way of example with FIGS. 16 through 19, other means can be used for engaging the inboard washer and the outboard washer so as to prevent rotation of the inboard washer and sleeve 116 about spindle 104. More particularly, FIGS. 16 and 17 depict a ring or outboard washer 220 having an inboard face 222 and an outboard face 224 that lie in parallel planes as indicated by 0 degrees. Outboard washer 220 includes a first plurality of axially-oriented openings 226 uniformly spaced apart from each other along circumferential direction C. For this embodiment, the first plurality of openings 226 extend from outboard face 224 to inboard face 222.

Outboard washer 220 defines a circular opening 230 (FIG. 17) through which spindle 104 extends in assembly 100. Outboard washer 220 includes a key 232 that extends radially inward into circular opening 230 and projects above radially inner surface 234. Key 232 is received into a complementary groove 136 on the distal end of spindle 104 as shown in FIG. 3 in assembly 100. As such, key 230 prevents outboard washer 220 from rotating relative to axle 106 within assembly 100. The width $W_{OW}$ of outboard washer 120—i.e. the dimension between radially inner surface 234 and radially outer surface 238—is uniform along circumferential direction C.

FIGS. 18 and 19 depict a ring or inboard washer 240—i.e. a washer that is positioned on spindle 104 at a location inboard of outboard washer 220. Inboard washer 240 has an outboard face 242 and an inboard face 244 that lie in non-parallel planes—i.e. planes that are angled with respect to each other by a non-zero angle β as indicated. In one exemplary embodiment of the present invention, angle β is equal to angle α. Inboard washer 240 also includes a second plurality of axially-oriented openings 246 uniformly spaced apart from each other along circumferential direction C. For this embodiment, the second plurality of openings 246 extend from outboard face 242 to inboard face 244.

Inboard washer 240 defines a circular opening 250 (FIG. 19) through which spindle 104 extends in assembly 100. Inboard washer 240 includes a plurality of bosses 252, 254, 256, and 258 that extend radially inward into circular opening 250 and project above radially inner surface 260. Bosses 252, 254, 256, and 258 are received into complementary notches 152n, 154n, 156n, and 158n, respectively, on the outboard end 162 of sleeve 116 (FIGS. 6 and 8). As such, the plurality of bosses and corresponding notches provided means to prevent inboard washer 240 and sleeve 116 from rotating relative to each other within assembly 100. Although four bosses and complementary notches are shown, in other configurations a different number may be used including e.g., 1, 2, 5, etc.

As shown in FIG. 19, the width $W_{IW}$ of the inboard washer 240—i.e. the dimension between radially inner surface 260 and radially outer surface 266—is non-uniform along circumferential direction C for reasons previously explained. Notably, width $W_{IW}$ is smallest at boss 256 and largest at boss 252. The difference in width $W_{IW}$ allows sleeve 116 to be received at least partially within opening 250 of inboard washer 140 while the distal tip of each boss 252, 254, 256, and 258 extends to the inner surface of revolution $SR_1$ of sleeve 116. As shown, axis $AR_1$ is offset relative to axis $AR_2$ for reasons previously explained.

In assembly 100 as shown in FIG. 2, outboard washer 220 and inboard washer 240 engage each other. For this exemplary embodiment, outboard washer 220 is rotatably received within recess 248 on the outboard face 252 of inboard washer 240. In other embodiments, recess 248 may be absent. At least one removable pin 268 (FIG. 16) is positioned within an opening 226 in outboard washer 220 and within an opening 246 in inboard washer 240. As such, openings 226, openings 246, and pin 268 provides means for engaging the outboard washer 220 and the inboard washer 240 so as to prevent the rotation of the inboard washer 240 and sleeve 116 about spindle 104 during operation of a vehicle that uses assembly 100. The number of openings 226 and 246, as well as their respective locations, can be selected to control the amount of correction achieved through rotation of inboard washer 240 by an amount equal to the distance between openings 246. For example, a different number of openings and spacings than shown in FIGS. 16 through 19 may be used. Also, the openings need not be equally spaced apart along circumferential direction C.

In order to adjust the wheel alignment—i.e. to adjust camber, toe, and thrust, axle nut 108 is loosened so that pin 268 can be removed at least from inboard washer 240. Sleeve 116 along with inboard washer 240 can then be rotated along circumferential direction C about spindle 104 to provide the correction desired based on the location of second axis $AR_2$ as previously described. Once sleeve 116 is in the desired circumferential position relative to spindle 104, pin 268 can be reengaged into a pair of openings 226 and 246 to prevent the rotation of inboard washer 140 (and, therefore, sleeve 116) about spindle 104.

Returning to FIG. 4, the intersection IX of axis $AR_1$ and axis $AR_2$, can be chosen so as to maintain alignment of any brake friction surfaces, such as brake pads against a disc, or a brake shoes against a brake drum, such that the brake friction surfaces remain as close to the same alignment as was originally intended prior to the camber, toe and or thrust angle adjustment of the spindle sleeve 116. In some exemplary embodiments of assembly 100, intersection point IX is chosen by positioning axes $AR_1$ and $AR_2$ such that intersection IX is located between the brake friction surfaces thereby minimizing brake component offset.

The magnitude of predetermined angle α is used to control the amount of wheel alignment that can be achieved through rotation of sleeve 116. In turn, the magnitude of predetermined angle α is limited by the thickness T (FIG. 7) of spindle sleeve 116. Thickness T must be of a magnitude to prevent deformation during handling of sleeve 116, installation of the sleeve 116 upon the spindle 104, or operation of the vehicle as the loads are transmitted from the vehicle through the spindle 104, spindle sleeve 116, wheel bearings 170, 180, hub 102 and to the road surface RS (FIG. 1).

Returning to FIGS. 4 and 5, a bearing spacer 188 allows excess axial forces to transfer through spacer 188 rather than bearings 170 and 180 so as to "preset" the bearing load. Bearing spacer 188 is machined to exact dimensions and matched relative to the dimensions of hub 102 that define the spacing between inboard bearing 170 and outboard bearing 180. It should be understood, that while this embodiment incorporates a bearing spacer 188 for case of installation and ensuring proper bearing preload, other embodiments may omit the spacer 188. Bearings 170 are positioned between outboard races 184 and 190 while bearings 180 are positioned between races 186 and 192.

Referring now to FIGS. 6 through 9, the thickness T of sleeve 116 as measured from inner surface $SR_1$ to outer surface $SR_2$ varies depending upon the azimuth location and longitudinal location along sleeve 116. As already described, these variations in thickness allow changes in wheel alignment based on rotation of sleeve 116 about spindle 104.

Inboard end 164 of sleeve 116 contains a radially outward protruding seal retaining lip 200 to prevent dislodgement of seal 202 (FIG. 4) from sleeve 116 during installation onto hub 102. An inboard spindle sleeve bearing surface 204 is manufactured to a size that will receive a cone or inner race of the inboard bearing 180. An outboard spindle sleeve bearing surface 206 is manufactured to a size that will receive a cone or inner race of the outboard bearing 170.

A reduced diameter surface 208 between inboard bearing surface 204 and outboard bearing surface 206 having a diameter less than the inboard bearing surface 204 eases assembly of inboard bearing 180 onto spindle sleeve 116. In this embodiment, reduced diameter surface 208 transitions to inboard bearing surface 204 with a first angled chamfer 210. Reduced diameter surface 208 transitions to outboard bearing surface 206 with a second angled chamfer 212. Inboard bearing surface 204 and outboard bearing surface 206 have diameters in this exemplary embodiment that are identical. However, other embodiments may have the outboard bearing surface 206 smaller than the inboard bearing surface 204, such as found in TN/TQ series bearings or TR series bearings.

As shown in FIG. 7, sleeve 116 has a seal surface 214 that, in this embodiment, has an appreciable larger diameter than inboard bearing surface 204. Other embodiments within the scope of the invention may have a seal surface 214 with a diameter equal to that of inboard bearing surface 204. In this embodiment, the inboard portion of sleeve inner surface $SR_1$ possesses a groove 216 in which a seal 218 (FIG. 4), such as an o-ring type seal, is placed to prevent leakage of lubricant from the inner part of the hub or from the ingress of contaminants.

FIG. 8 depicts an end view of sleeve 116 from outboard end 162. For this orientation, sleeve 116 in this embodiment is thinner at the top than at the bottom as a result of the relative positioning of the axis $AR_2$ relative to axis $AR_1$. Inner surface $SR_1$ can be observed along the top half of sleeve 116 from this view since the inner surface axis $AR_1$ is angled down and away from the point of view of the figure. In this embodiment, no appreciable toe angle is present. However, it can be appreciated that a variation in the circumferential position of angle α—or axis $AR_2$ relative to $AR_1$—would result in a change in the wheel alignment.

As stated, assembly 100—including sleeve 116—can be retrofitted to existing axle systems. In addition, the retrofit can be accomplished regardless of the circumferential location of groove 136 on the outboard end of spindle 112. Assembly 100 is additionally advantageous because its components—including sleeve 116—can be installed on either side (driver left or driver right) of a vehicle.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An assembly for selectively adjusting the alignment of a wheel on the spindle of a vehicle's axle, comprising:
   a sleeve having an inner surface of revolution about a first axis and an outer surface of revolution about a second axis, wherein the first axis and the second axis are at a non-zero angle $\alpha$ from each other, the sleeve defining an interior for receipt of the spindle, the sleeve having an inboard end and an outboard end;
   an inboard washer received onto the outboard end of the sleeve, the inboard washer having an inboard face and an opposing, outboard face forming a non-zero angle $\beta$ with the inboard face;
   means for preventing the rotation of the inboard washer relative to the sleeve;
   an outboard washer located at the outboard end of the sleeve at a position adjacent to the inboard washer, the outboard washer having an inboard face and an opposing, outboard face, wherein the outboard washer includes at least one key for engaging the spindle and preventing rotation of the outboard washer relative to the spindle; and
   means for engaging the inboard washer and the outboard washer so as to prevent rotation of the inboard washer and sleeve about the spindle.

2. The assembly for selectively adjusting the alignment of a wheel as in claim 1, wherein the means for preventing the rotation of the inboard washer relative to the sleeve comprises:
   at least one notch defined along an outboard end of the sleeve; and
   at least one boss extending radially inward from the inboard washer and received into the at least one notch.

3. The assembly for selectively adjusting the alignment of a wheel as in claim 1, wherein the means for preventing the rotation of the inboard washer relative to the sleeve comprises:
   a plurality of notches defined along an outboard end of the sleeve and spaced apart from each other along a circumferential direction of the sleeve; and
   a plurality of bosses extending radially inward from the inboard washer, each boss received into the at least one of the plurality of notches of the sleeve.

4. The assembly for selectively adjusting the alignment of a wheel as in claim 3, wherein the plurality of bosses extend radially inward by amounts that are non-uniform relative to each other.

5. The assembly for selectively adjusting the alignment of a wheel as in claim 1, wherein the means for engaging the inboard washer and the outboard washer so as to prevent rotation of the inboard washer about the outboard end of the sleeve comprises
   a first plurality of gear teeth positioned along the inboard face of the outboard washer; and
   a second plurality of gear teeth positioned along the outboard face of the inboard washer;
   wherein the first and second plurality of gear teeth are engaged in a complementary manner with each other that prevents the rotation of the inboard washer and outboard washer relative to each other.

6. The assembly for selectively adjusting the alignment of a wheel as in claim 5, wherein the first plurality of gear teeth are evenly spaced along a circumferential direction of the outboard washer and the second plurality of gear teeth are evenly spaced along a circumferential direction of the inboard washer.

7. The assembly for selectively adjusting the alignment of a wheel as in claim 6, wherein the first plurality of gear teeth and the second plurality of gear teeth are each separated by grooves configured for complementary receipt of gear teeth.

8. The assembly for selectively adjusting the alignment of a wheel as in claim 7, wherein the first plurality of gear teeth and the second plurality of gear teeth are each oriented along a radial direction of the respective outboard and inboard washers.

9. The assembly for selectively adjusting the alignment of a wheel as in claim 1, wherein angle $\alpha$ is in the range of $0.1° \leq \alpha \leq 0.7°$.

10. The assembly for selectively adjusting the alignment of a wheel as in claim 1, wherein angle $\alpha$ is about $0.3°$.

11. The assembly for selectively adjusting the alignment of a wheel as in claim 1, wherein angle $\alpha$ is equal to angle $\beta$.

12. The assembly for selectively adjusting the alignment of a wheel as in claim 1, wherein the sleeve has a thickness that varies along an axial direction of the spindle.

13. The assembly for selectively adjusting the alignment of a wheel as in claim 1, wherein the means for engaging the inboard washer and the outboard washer so as to prevent rotation of the inboard washer and sleeve about the spindle comprises:
   a first plurality of openings positioned on the outboard washer;
   a second plurality of openings positioned on the inboard washer; and
   a removable pin extending through one of the first plurality of openings and through one of the second plurality of openings.

14. The assembly for selectively adjusting the alignment of a wheel as in claim 13, wherein the first plurality of openings are evenly spaced about a circumferential direction of the outboard washer and the second plurality of openings are evenly spaced about a circumferential direction of the inboard washer.

15. The assembly for selectively adjusting the alignment of a wheel as in claim 13, wherein the outboard washer is rotatably received within a recess on the outboard face of the inboard washer.

* * * * *